Dec. 15, 1931.             W. E. HOLLAND ET AL             1,837,125
                              ELECTRICAL SYSTEM
                            Filed Oct. 31, 1927      2 Sheets-Sheet 1

Inventors:
Walter E. Holland
William H. Grimditch
by their Attorneys,
Howson & Howson

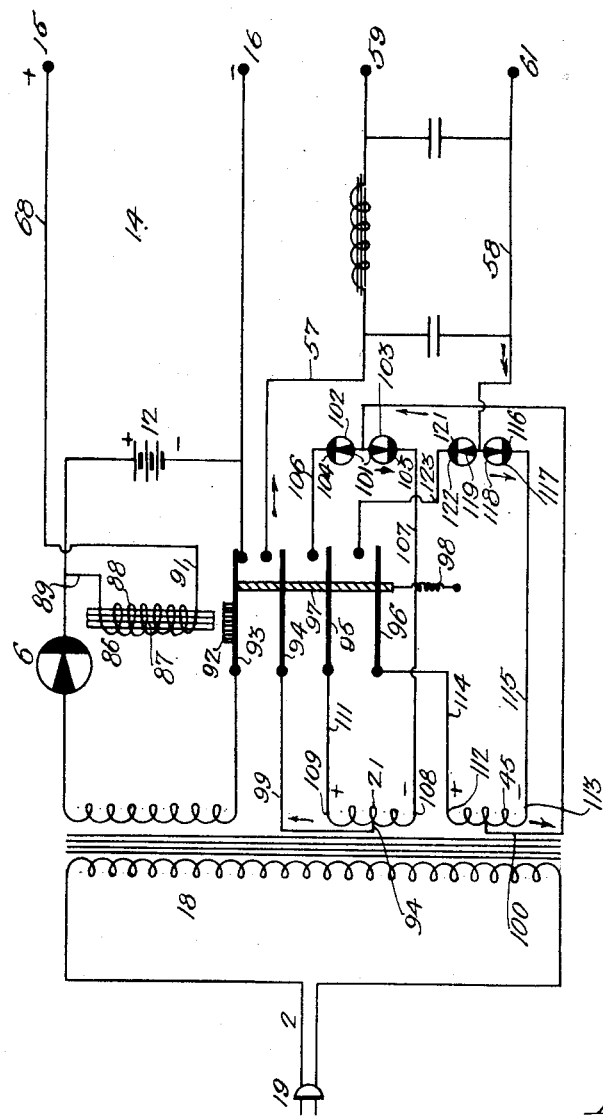

Patented Dec. 15, 1931

1,837,125

UNITED STATES PATENT OFFICE

WALTER E. HOLLAND, OF PHILADELPHIA, AND WILLIAM H. GRIMDITCH, OF GLENSIDE, PENNSYLVANIA, ASSIGNORS TO PHILADELPHIA STORAGE BATTERY COMPANY, OF PHILADELPHIA, PENNSYLVANIA, A CORPORATION OF PENNSYLVANIA

ELECTRICAL SYSTEM

Application filed October 31, 1927. Serial No. 230,086.

Our invention relates to electrical systems, having particular relation to systems of power supply, such, for example, as are applicable to thermionic circuits.

One object of our invention is to provide a simple and efficient power-supply system embodying a plurality of rectifier units characterized by the fact that potentials may be obtained at the output terminals of the system which are in excess of the safe working potentials of the independent rectifier units.

Another object of our invention is to provide a high-voltage power-supply system for vacuum-tube apparatus and the like, wherein a plurality of rectifier units energized by alternating-current sources of energy are so connected that their rectified voltages add,— the system further contemplating the substantial simultaneous control of these rectifier units and a battery-charging rectifier unit in accordance with battery load conditions.

A further object of our invention is to provide electrical power-supply apparatus comprising a permanently energized primary winding, a plurality of secondary windings, means including rectifying units for connecting at least two of the secondary windings in series-circuit relation, so that the rectified voltages of these windings are in predetermined relation, and means for substantially simultaneously rendering ineffective the rectifying units associated with the two windings.

Other objects and applications of our invention, as well as details of construction and operation, whereby our invention may be practiced, will be apparent more fully hereinafter, when taken in connection with the accompanying drawings, wherein Fig. 1 is a diagrammatic view of circuits and apparatus embodying our invention; and Fig. 2 is a similar view of an alternative embodiment of our invention.

Referring to Fig. 1, the power-supply system therein shown comprises broadly a transformer 1 having a permanently-energized primary circuit 2 and a plurality of secondary circuits 3, 4 and 5; rectifier units 6, 7 and 8 for the secondary circuits 3, 4 and 5, respectively; a common output circuit 9 for the secondary circuits 4 and 5 terminating in high-voltage B output terminals 11; a storage battery 12 which is so connected in the secondary circuit 3 that the latter may constitute a charging circuit 13; a battery output circuit 14 terminating in positive and negative low-voltage A terminal connections 15 and 16, respectively; and a relay 17 operable in accordance with the load conditions at the terminal connections 15 and 16 to close the secondary circuit 3 and open the secondary circuits 4 and 5, and vice versa. It is here noted that certain of the foregoing parts constitute features of our co-pending application, Serial No. 224,478, filed Oct. 6, 1927, and assigned to Philadelphia Storage Battery Company.

Considering the power-supply system in greater detail, the primary circuit 2 of the transformer 1 comprises a single permanently-energized primary winding 18 and a reversible plug 19 adapted to be associated with an alternating current supply circuit (not shown). The secondary circuit 4 comprises a secondary winding 21, opposite terminals 22 and 23 of which are respectively connected by conductors 24 and 25 to an anode 26 of a cell 27 and to an anode 28 of a cell 29. The conductor 25 is also connected to a cathode 31 of a cell 32, while the conductor 24 is further connected by a conductor 33 to a cathode 34 of a cell 35. Anodes 36 and 37 of cells 35 and 32 are interconnected by a conductor 38. Similarly, cathodes 39 and 41 of cells 27 and 29 are respectively connected by a conductor 42. These cells together constitute the rectifier unit 7 and may be of any well-known type, such, for example, electrolytic cells, wherein aluminum, tantalum or other film-forming metals are employed as rectifying electrodes. The secondary circuit 4 further includes positive and negative conductors 43 and 44 which respectively extend from the pairs of cathodes 39 and 41 and the pairs of anodes 36 and 37.

The secondary circuit 5, for purposes of illustration, has been shown as a substantial duplication of the circuit 4, and it comprises a secondary winding 45; conductors 46, 47 and 48; cells 49, 51, 52 and 53 which are associated with these conductors in the same manner as the corresponding parts in circuit 4; and a pair of positive and negative output conductors 54 and 55 corresponding to the conductors 43 and 44 extending from the rectifier unit 7.

As previously noted, our invention contemplates the obtaining of direct-current potentials which are of a value greater than the safe working potential of a single rectifier unit such as 7 or 8. To this end, we connect the secondary circuits 4 and 5 in such manner that the rectified voltages of the two circuits add. Accordingly, the negative conductor 44 of the secondary circuit 4 is connected to the positive conductor 54 of the secondary circuit 5 by means of a conductor 56, and the positive conductor 43 and the negative conductor 55 are respectively connected by conductors 57 and 58 to positive and negative terminal connections 59 and 61 of the output terminals 11,—the positive and negative conductors 57 and 58 constituting the common output circuit 9 for the rectifier units 7 and 8.

Considering the operation of the apparatus just described in detail, when the plug 19 is electrically connected to the alternating-current supply circuit (not shown), alternating currents traverse the primary circuit 2, thereby inducing alternating potentials in the secondary transformer windings. Assuming that at any particular instant, the potential of the terminals 22 of the secondary windings 21 and 45 is positive, currents flow from the transformer secondary winding 21 through the conductor 24, the cell 27 of the rectifier unit 7, the positive conductor 43, the conductor 57 of the output circuit 9, the terminal connection 59, vacuum-tube apparatus connected to the B output terminals 11, the terminal connection 61, the conductors 58 and 55, the cell 52 of the rectifier unit 8, the winding 45 of the secondary circuit 5, the cell 49 of the unit 8, conductors 54, 56 and 44, the cell 32 of the rectifier unit 7, and the conductor 25, to the secondary winding 21.

When the polarity of the secondary windings 21 and 45 reverses, currents pass from the terminal 23 of the secondary circuit 4, through the cell 29 of the rectifier unit 7, the conductors 43 and 57, the terminal connection 59, the vacuum-tube apparatus, the terminal connection 61, the negative conductors 58 and 55, the cell 53 of the rectifier unit 8, the winding 45 of the secondary circuit 5, the cell 51 of the rectifier unit 8, the conductors 54, 56 and 44, the cell 35 of the rectifier unit 7, the conductor 33, and the conductor 24, to the winding 21 of the secondary circuit 4. Thus, not only are both half waves of the alternating-current cycle rectified but the output terminals 11 are supplied with a potential which is the sum of the rectified potentials of the rectifier units 7 and 8. There is hence no occasion to operate the rectifier units above their normal rating in order to obtain high potentials at the output terminals 11.

Referring to the secondary circuit 3 of the transformer 1, the charging rectifier unit 6 may be any one of a number of known types and, for purposes of illustration, has been shown as embodying an anode 62 and a cathode 63. The anode 62 is connected to a secondary winding 64 of the secondary circuit 3 by means of a conductor 65, while the cathode 63 is connected by a conductor 66 to the positive terminal of the storage battery 12. The negative terminal of the battery 12 is connected by a conductor 67 to the secondary winding 64, thus completing the battery-charging circuit 13. The positive terminal of the battery 12 is also connected by a conductor 68 to the positive terminal connection 15 and the negative battery terminal is connected by a conductor 69 to the negative terminal connection 16, thereby completing the battery out-put circuit 14. The rectifier unit 6 is so connected with respect to the storage battery 12 that currents pass through the latter in a direction opposite to that occurring under discharge conditions. Hence, when the primary circuit 2 is energized, currents traverse the secondary circuit 3 and are rectified at the unit 6, so that uni-directional currents pass through the battery 12.

Our invention also includes means for automatically causing the alternate energization and de-energization of the secondary circuit 3 and the series-connected secondary circuits 4 and 5. The means is also adapted to render ineffective automatically the charging rectifier unit 6 when the rectifier units 7 and 8 are rendered effective, and vice versa. These desired results are effected by the provision of the relay 17 which comprises a movable core 71, an actuating winding 72 and movable contact portions 73, 74 and 75. The contact portion 73 is normally maintained by a spring 76 in engagement with a pair of stationary contact members 77 and 78 which are included in spaced relation in the conductor 67 leading from the negative terminal of the storage battery 12 to the transformer secondary winding 64. Such position of the movable contact portion 73 causes the completion of the secondary circuit 3 and hence the charging of the storage battery 12.

When the movable contact portion 73 occupies the circuit-closing position just described, the contact portions 74 and 75 are disposed in spaced relation to pairs of separated stationary contact members 79—81 and 82—83 which are positioned in the conductors 24 and 46 of the secondary circuits 4 and 5 respectively. Since these conductors are thus open circuited, the rectifier units 7 and 8 are respectively disconnected from their associated secondary windings 21 and 45 and thereby rendered ineffective. So long as the rectifier units 7 and 8 are ineffective or de-energized, no potentials are available at the output terminals 11. As above noted, at this time, the battery 12 is under charge.

The charging of the battery 12 and the de-energization of the rectifier units 7 and 8 continues while the actuating winding 72 of the relay 71 is de-energized. In accordance with our invention, energy may be supplied to the winding 72 by the connection of the same directly in the battery output circuit 14, as shown in Fig. 1. To this end, one terminal of the actuating winding 72 is connected by conductor 84 to the positive terminal of the storage battery 12, while the other terminal is connected by conductor 85 to the positive conductor 68 of the output circuit 14. The output circuit 14, as thus completed, extends from the positive terminal connection 15 to the terminal negative connection 16 through the conductors 68 and 85, the relay actuating winding 72, the conductor 84, the storage battery 12 and the conductor 69. The relation of the movable contact portions 73, 74 and 75 to the pairs of co-acting stationary contact members 77—78, 79—81 and 82—83 is such that upon the energization of the relay actuating winding 72, the movable contact portion 73 is actuated out of engagement with its co-acting stationary contact members, but the remaining contact portions 74 and 75 are actuated into engagement with their co-acting contact members, so that the charging circuit 13 is interrupted and the secondary circuits 4 and 5 completed, rendering the rectifier units 7 and 8 effective.

In operation, assuming that the plate circuits of a vacuum-tube receiving system are connected to the high-voltage terminal connections 59 and 61, that the filament circuits thereof are connected to the low-voltage terminal connections 15 and 16, and that the plug 19 is electrically connected to an alternating-current supply system (not shown), the closing of the filament switch (not shown) establishing a load in the filament circuit of the storage battery 12,—the currents passing therefrom through the actuating winding 72 of the relay 71, the conductor 68, the terminal connection 15, the filament circuit (not shown), the terminal connection 16 and the conductor 69 to the negative terminal of the storage battery 12.

The energization of the relay 71, however, causes the actuation of the movable contact portion 73 out of engagement with its pair of stationary contact members 77—78 and the engagement of the contact portions 74 and 75 with their pairs of stationary contact members 79—81 and 82—83, respectively. As a result of the disengagement of the contact portion 73 from its co-acting stationary contact members, the negative terminal of the storage battery 12 is disconnected from the winding 64 and the secondary charging circuit 13 is thereby interrupted. Such interruption, however, does not affect the output circuit 14 which has been previously completed by the closing of the switch in the vacuum-tube filament (not shown). The bridging of the stationary contact members 79—81 and 82—83 completes the secondary circuits 4 and 5, so that currents now traverse the serially connected secondary windings 21 and 45, the rectifier units 7 and 8, the output circuit 9 and the plate circuit of the vacuum-tube apparatus in a manner previously described.

In the event that it is desired to render ineffective the power-supply apparatus, it is only necessary to open the filament circuit, as by removing the vacuum tubes from their sockets or opening the previously mentioned filament switch. The opening of the filament circuit results in the removal of the load from the storage battery 12, and the consequent interruption in the passage of currents through the relay actuating winding 72. The spring 76 then causes the movable contact portion 73 to bridge the pair of co-acting stationary contact members 77—78, and the contact portions 74 and 75 to be disengaged from their co-acting stationary contact members 79—81 and 82—83. The interruption of the secondary circuits 4 and 5 prevents the further passage of currents from the terminal connections 59 and 61.

The system shown in Fig. 2 is characterized by the fact that it requires three breaks in the high-voltage secondaries in order to render the full wave rectifiers ineffective as compared with Fig. 1 which requires only two breaks. A relay switch 86 is employed comprising a core 87; an actuating winding 88 of which is connected by conductors 89 and 91 to the battery 12 and the conductor 68, respectively; an armature 92; switches 93, 94, 95 and 96 which are secured together by an insulating member 97, the switch 93 carrying the armature 92; and a spring 98 for normally causing these switches to occupy the position shown in Fig. 2.

The secondary windings 21 and 45 have conductors 99 and 100 extending respectively from internal tap connections to the switch 94 and the anodes 101 of a pair of oppositely connected rectifiers 102 and 103. Cathodes 104 and 105 of these rectifiers are respectively connected by conductors 106 and 107 to the switch 95 and one terminal 108 of the secondary winding 21. An opposite terminal 109 of the winding 21 is connected by a conductor 111 to the switch 95. The switch 94 is connected to the positive terminal connection 59 by the conductor 57.

The secondary winding 45 has its terminals 112 and 113 respectively connected by conductors 114 and 115 to the switch 96 and to the cathode 116 of a rectifier 117. The anode 118 of the rectifier is connected to an anode 119 of an oppositely connected rectifier 121 and also to the negative conductor 58. A cathode 122 of the rectifier 121 is connected by a conductor 123 to the switch 96.

When the relay 86 is deenergized, the switch 93 is closed permitting the battery 12 to be charged but the switches 94, 95 and 96 are held open under the force of the spring 98. However, when the relay 86 is energized by the passage of currents through the winding thereof, as occurs in the case of Fig. 1, the switch 93 is opened, but the switches 94, 95 and 96 are closed. If the terminal connections 109 and 112 of the secondary windings 21 and 45, respectively, are positive, then currents traverse the rectifiers 103 and 117 and connected circuits in the direction indicated by the arrow. When the polarity of the transformer windings 21 and 45 reverses, this rectification is effected by the rectifiers 102 and 121. Thus full wave rectification is effected.

While we have shown only one embodiment of our invention, for the purpose of describing the same and illustrating its principles of construction and operation, it is apparent that various changes and modifications may be made therein, without departing from the spirit of our invention. We desire, therefore, that only such limitations shall be imposed thereon as are indicated in the appended claims or as are demanded by the prior art.

We claim:

1. In combination, a plurality of sources of alternating currents, a full-wave rectifier individual to each energy source, means for so connecting said rectifiers that the rectified voltages may add, and means for simultaneously open-circuiting said alternating current sources.

2. The combination with a plurality of independent transformer secondary windings constituting energy sources, of rectifying units for said energy sources, respectively, means for so interconnecting at least two of said energy sources that the rectified voltages may add, a third of said energy sources being connected to a storage battery through one of said rectifying units, and means comprising a switch whereby said last-mentioned unit may be rendered effective and said first-mentioned units rendered ineffective.

3. In a power device, the combination with a plurality of independent transformer secondary windings constituting energy sources, at least two of said energy sources being connected to independent rectifying units, of terminal connections, means for so interconnecting said independent units and said terminal connections that the direct-current potentials available at said terminal connections may be greater than the safe working voltage of one of said independent rectifier units, a rectifier unit and a storage battery connected to another of said energy sources to form a charging circuit, and means whereby said last-mentioned circuit may be rendered effective in the absence of direct-current potentials at said terminal connections.

4. A power-supply system comprising a plurality of independent transformer secondary windings constituting alternating-current energy sources, a pair of rectifier units for two of said energy sources, means for so associating said units that the rectified voltages may add, a storage battery and a charging rectifier connected to another of said energy sources to form a charging circuit, and means responsive to battery load conditions for rendering ineffective said battery circuit and for simultaneously rendering effective said pair of rectifier units.

5. An electrical power-supply system comprising a plurality of independent transformer secondary windings constituting alternating-current energy sources, rectifier units for said energy sources, respectively, terminal connections, means for so interconnecting said terminal connections and at least two of said rectifier units and associated energy sources that potentials may be obtained at said terminal connections different than the working potentials of said last-mentioned rectifier units, a storage battery having terminal connections, a charging circuit including said storage battery and another of said energy sources and associated rectifying unit, and means responsive to load conditions at said storage-battery terminal connections, whereby said charging circuit may be rendered effective and said pair of rectifier units simultaneously disconnected from their respective energy sources.

6. A power-supply device comprising a transformer having a single primary winding and a plurality of independent secondary windings, a plurality of rectifying units for said secondary windings, at least two of said rectifying units being so connected that their rectified voltages are in predetermined relation, and a relay for alternately causing the energization of said two rectifier units and the de-energization of a third rectifier unit.

7. A transformer having a permanently energized primary winding and a plurality of independent secondary windings, rectifying units for said secondary windings, terminal connections, means for interconnecting said terminal connections and at least a pair of said rectifier units, so that potentials may be obtained at said terminal connections in excess of the working potential of one of said pair of units, a battery charging circuit including another of said secondary windings and its associated rectifier unit, and a relay responsive to battery load conditions adapted to cause the open circuiting of said charging circuit and the substantially simultaneous connection of said pair of rectifier units to their associated secondary windings.

8. A radio power unit comprising a transformer having a permanently energized primary winding and a plurality of independent secondary windings, rectifier units for said secondary windings, respectively, terminal connections, means for so interconnecting a pair of rectifier units and said terminal connections that potentials may be obtained at said terminal connections in excess of the working potential of one of said pair of units, a storage battery having terminal connections a charging circuit including said storage battery and another of said secondary windings and associated rectifier unit, and a relay responsive to load conditions at said battery terminal-connections, whereby said pair of rectifier units may be connected to their secondary windings and said charging circuit interrupted, and vice versa.

9. In combination, a receiving system, a power-supply system including means for supplying B current to said receiving system, and automatic means responsive to load conditions in said receiving system for disconnecting said first-mentioned means from said power-supply system when said receiving system is de-energized and for connecting said first-mentioned means to said power-supply system when said receiving system is energized, said first-mentioned means including a plurality of independent full-wave rectifiers so connected that the rectified voltages thereof add.

10. In combination, a receiving system including a vacuum tube, a filament-energizing circuit therefor including an A battery and a switch, a power-supply system including means for supplying B current to said receiving system, means for charging said A battery, and automatic means controlled by said switch for selectively rendering effective and ineffective said first and second-mentioned means, at least one of said means including a plurality of independent full-wave rectifiers so connected that the rectified voltages thereof add.

11. In combination, a receiving system including a vacuum tube, a filament-energizing circuit therefor including an A battery and a switch, a power-supply system including means for supplying B current to said receiving system, means for charging said A battery, and a relay responsive to said filament-energizing circuit for selectively rendering effective said first-mentioned means when said filament-energizing circuit is closed and for rendering effective said second-mentioned means when said filament-energizing circuit is opened, said first-mentioned means including a plurality of independent full-wave rectifiers so connected that the rectified voltages thereof add.

WALTER E. HOLLAND.
WILLIAM H. GRIMDITCH.